United States Patent [19]

Woltman

[11] Patent Number: 4,934,187

[45] Date of Patent: Jun. 19, 1990

[54] FLOW METER FOR INSERTION IN AQUARIUM FILTER FLOW TUBE

[76] Inventor: Klaus Woltman, 18 Myrtle Ave., Demarest, N.J. 07627

[21] Appl. No.: 334,597

[22] Filed: Apr. 6, 1989

[51] Int. Cl.⁵ .............................................. G01F 1/22
[52] U.S. Cl. ................................... 73/198; 73/861.57
[58] Field of Search ............... 73/861.54, 861.57, 198, 73/861.55

[56] References Cited

U.S. PATENT DOCUMENTS 3,693,441  9/1972  Obstfelder ...................... 73/861.54
3,937,082  2/1976  Schilling ......................... 73/861.54

Primary Examiner—Herbert Goldstein
Attorney, Agent, or Firm—Helfgott & Karas

[57] ABSTRACT

A flow meter insertable into a riser tube or an intake tube of an aquarium filter includes an insert placed in the tube and along which water flows as it is drawn by means of a power head, impeller or pump. A flow restriction arrangement, defines a flow path with respect to the insert. The insert carries an elongated slot with a scale and has two oppositely directed semi-circular flanges dimensioned so that they block water from flowing through the entire area of the container but allow the water to enter on one side of the insert, then flow into the slot and exit along the opposite side of the insert. A metering float inserted adjacent the scale and is positioned at a level height relative to the flow rate of water passing the insert. This value can be read on the scale.

32 Claims, 4 Drawing Sheets

FLOW METER FOR INSERTION IN AQUARIUM FILTER FLOW TUBE

BACKGROUND OF THE INVENTION

The present invention pertains to aquarium filters, and more particularly to a device for measuring a flow rate of water flowing from an aquarium tank through a filter and returned to the aquarium tank. More specifically, the invention pertains to a flow meter insertable in a flow tube leading to a pump or power head by which water is drawn through the flow tube and is returned to the aquarium tank.

External and internal aquarium filters are regularly utilized for aeration and filtration of aquarium water and also to provide circulation to the water in the aquarium tank. One type of aquarium filter is an externally mounted filter which accommodates a filtration medium and includes an impeller mechanism inducing the circulation of water from the aquarium through the filtration medium and then returns the clean water to the aquarium. Another type of aquarium filter is an internal filter typically disposed beneath the surface of the aquarium bed and known as an undergravel aquarium filter. Undergravel aquarium filters are equipped with a riser tube which conducts water passed through the gravel bed and the perforated plate of the filter back to the water within the aquarium tank above the perforated plate. So-called power heads are utilized for drawing the water through the gravel bed and into a chamber under the perforated plate of the filter. The power head then causes water to flow upward in the riser tube and back into the aquarium tank. Alternately, an air pump coupled to an air store can be used with the air store suspended within the riser tube and causing an air lift of the water in the riser tube.

In certain cases, it may be desirable to measure the flow rate of water flowing through the filter of the external or internal type and circulated back into the aquarium tank.

Flow meters for measurement of fluid flow rate are well known in the art. One of the known types of flow meters is a rotameter which is comprised of a float positioned inside a tapered tube and, by action of fluid flowing up through the tube, is moved inside the tube. A flow restriction is provided at an annular area between the float and the tube and this area increases in the direction of rise of the float. The pressure differential is fixed, determined by the weight of the float and the buoyant forces. The annular area and hence the float level increase with the flow rate. The rotameter is calibrated for direct flow reading by etching an appropriate scale on the surface of the tube. The calibration depends on the float dimensions, tube taper and fluid properties.

In using a flow meter for an aquarium filter it is desirable to have the flow meter easily cleaned, simple in operation, safe for the fish inhabitants of the aquarium, and preferably of a type easily replaceable.

SUMMARY OF THE INVENTION

It is an object of the present invention to provide a flow meter for insertion in a flow tube connected to a power head or pump which draws water through the flow tube, the water coming from an aquarium tank, and returns it back to the tank.

It is another object of the present invention to provide a flow meter for measuring flow rate of water being filtered and returned into an aquarium tank.

It is a further object of the invention to provide a flow meter having a wide volumetric range.

Yet another object of the invention is to provide a variable-area flow meter which is easy to use with aquarium filters.

Briefly, in accordance with the invention, there is provided a flow meter for insertion in a flow tube of an aquarium filter. The flow tube can be the riser tube of an undergravel filter having a power head at its top for drawing water through the tube and past the flow meter, or with an air lift formed in the riser tube. Alternately, the flow can be the intake tube of an external aquarium filter having one end inserted in the tank and another end discharging into the filter. An impeller at the discharge end draws water through the intake tube and past the flow meter.

The flow meter includes a substantially flat elongated plate snugly fit within the flow tube so that preferably no water can leak on the sides between the edges of the plate and the inner wall of the flow tube. The plate substantially splits the tube longitudinally in two halves. The plate includes an elongated slot along its length and two end flanges extending normal to and oriented in two opposing directions relative to the plate. Each flange is a semicircle that closes off its half of the flow tube. A scale is provided along the slot, and a metering float is positioned between one side of the plate and the container wall in between the two flanges. Water enters the flow tube and as it gets to the flow meter is blocked on one side by the lower flange and is forced to flow along only one side of the plate. It is on that side that the float is positioned. The water flows along side the plate but is blocked from exiting by the upper flange. The water therefore flows through the elongated slot to the other side of the plate. The flowing water crossing through the slot lifts the float. The height to which it lifts the float is dependent upon the rate of flow of the water. This height can be calibrated in terms of rate of flow and read out on the scale adjacent the slot.

In an embodiment, the insert includes two narrow fingers each extending normal to the plate and away from the respective flange provided on the end of the insert to provide a tight fit of the insert in the flow tube.

In an embodiment, the metering float is ball-shaped.

In an embodiment, the flow meter is positioned in the aquarium filter downstream of the power head, pump, or air store.

The aforementioned objects, features and advantages of the invention will, in part, be pointed out with particularity, and will, in part, become obvious from the following more detailed description of the invention, taken in conjunction with the accompanying drawing, which form an integral part thereof.

DETAILED DESCRIPTION OF THE PREFERRED EMBODIMENT

Figures 1, 2, 3:
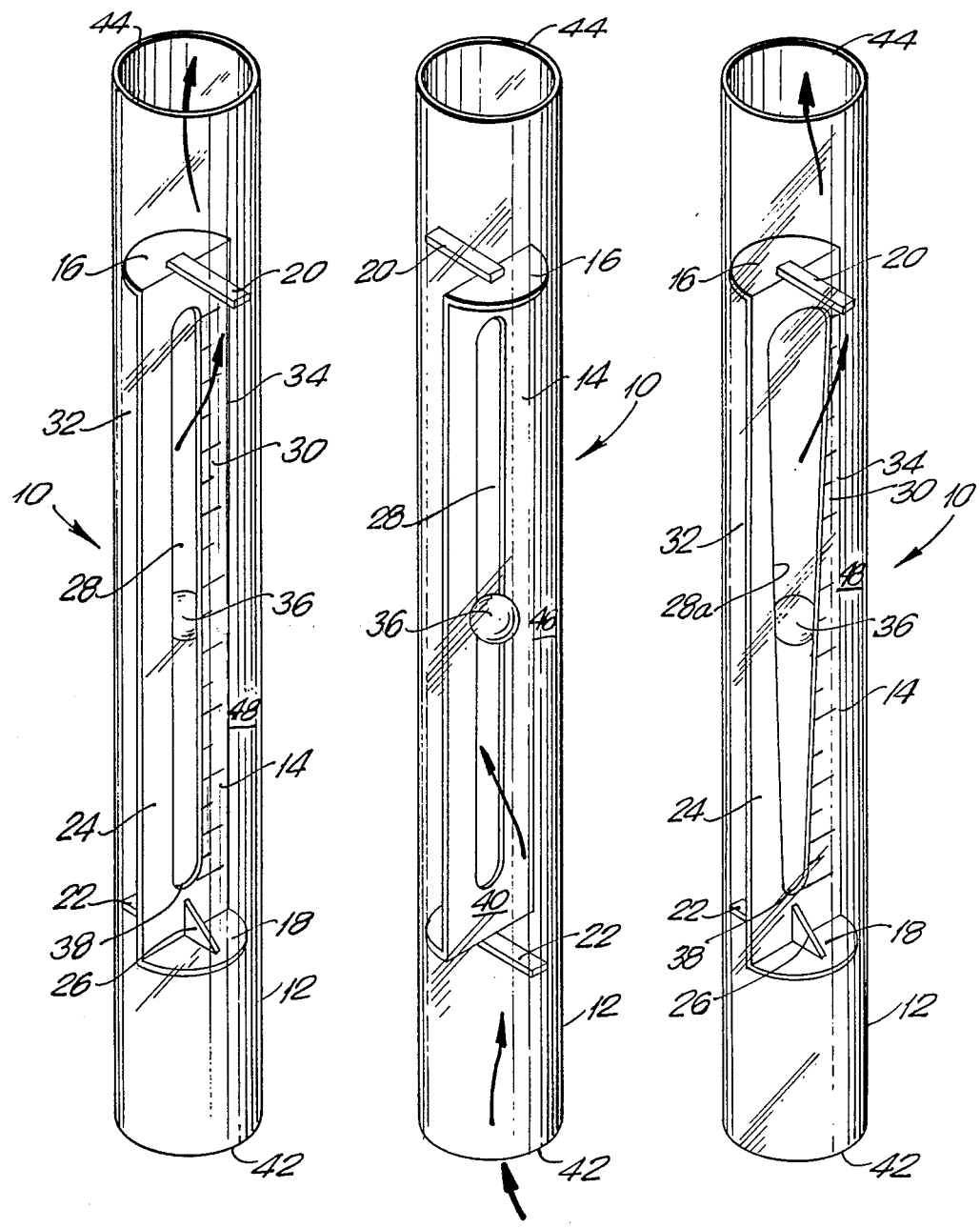
FIG. 1 is a front elevational view of the flow meter inserted in a flow tube according to the invention.
FIG. 2 is a rear elevational view of the flow meter of FIG. 1.
FIG. 3 is a front elevational view of an alternate embodiment of the flow meter.

Referring now to the drawings, therein shown a flow meter which is designated generally by reference numeral 10 and is inserted in a substantially cylindrical flow tube 12 of transparent material, for example, glass or plastic. At its upper end will be a pump, vacuum, impeller, or the like to draw water up through the flow tube. An insert 14 comprised of a flat elongated plate 24 is placed in the flow tube 12 so that two oppositely oriented end flanges 16 and 18 provided on plate 24 snugly fit within the interior of tube 12. Each end flange 16, 18 is of a semi-circular configuration and has an outwardly extending narrow finger 20, 22. Each finger 20, 22 diametrically opposes the respective semi-circular flange. The end face of each finger includes with the remotest point of the semi-circular flange a diameter which corresponds to the inner diameter of the flow tube 12 so that there is a reliable and tight fit of insert 14. This snug fit will also serve to hold the insert at a predetermined level in flow tube 12. A substantially triangular plate 26 can be provided at each end of plate 24 between the end portion of plate 24 and each outwardly protruding end flange 16, 18. Each, plate 26 is attached to the respective surfaces of insert 14 to increase rigidity of the end flange 16, 18.

The plate 24 is formed with an elongated slot 28 extending therethrough and forming a path for water flow, as will be explained hereinafter. A scale 30 is provided on a front side 38 of plate 24, adjacent the elongated slot.

It is to be understood that the straight-line slot shown in FIGS. 1 and 2 is only as an exemplified embodiment. Slots of varying cross-sectional area can be provided, as for example, the upwardly flaring slot 28, of FIG. 3. Such varying the size of the slot varies the area for the flow path. Such variations can be used to adjust the scale 30' increments, and to control the other variables such as the weight of the float, etc.

It is to be pointed out that the diameter of each flange 16, 18 and the width of elongated plate 24 correspond to the inner diameter of flow tube 12 whereby no flow is permitted between the inner wall of tube 12 and each of the opposite lateral side edges 32, 34 of plate 24. Likewise, each flange blocks half of the flow tube serving to divert the flow path to the opposite side of the plate 24.

A metering float 36 is provided, in the exemplified embodiment of the present invention, as a ball located at a back side 40 of plate 24 between the flat surface of the plate and the inner wall of tube 12.

The flow path for the water entering a lower distal end 42 of flow tube 12, as shown by arrows, is blocked by lower flange 18 and is directed into a channel included between the inner wall of tube 12 and the back side 40 of plate 24. Then water, prevented to flow upwardly towards an upper distal end 44 of flow tube 12 by the upper flange 16, is forced through elongated slot 28 to the front side of plate 24 and, from there, unobstructed, exits from the open end 44 of flow tube 12. Thus, the flow restriction area in the flow meter according to the invention is provided in two semi-circular channels 46 and 48, each limited by the front or back surface of plate 24, respectively, and the facing inner wall of flow tube 12.

The ball-shaped float 36 will be positioned inside the flow tube 12 by action of water flowing up through the tube. The level position of float 36 corresponds to the flow rate of water passing through the flow tube this can be read out on scale 30.

Figure 4:
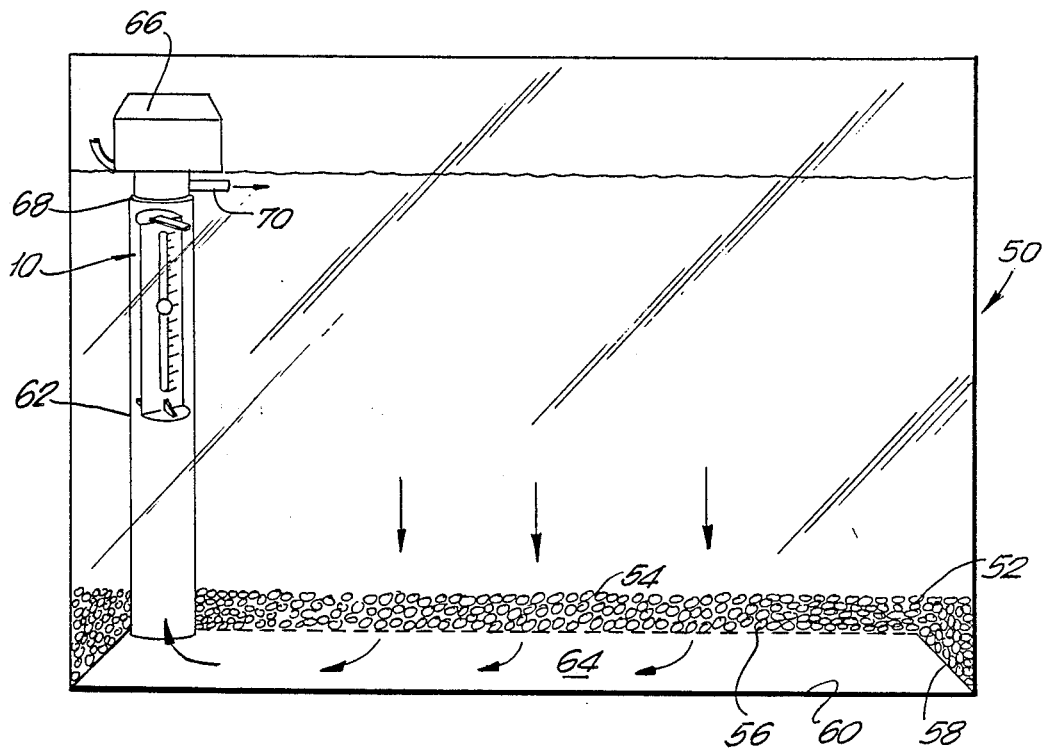
FIG. 4 is a side view of an undergravel filter located within an aquarium tank and a riser tube with the flow meter of FIG. 1 inserted therein.

Referring now to FIG. 4, there is shown an aquarium tank 50. An undergravel filter 52 includes a gravel bed 54 which is supported on a perforated flat supporting plate 56 of filter 52. A skirt 58 holds the gravel bed 54 in spaced relationship with a bottom wall 60 of the aquarium tank.

A riser tube 62 extends upwardly from a clear water chamber 64 below the perforated plate 56. A power head 66 is seated on an upper edge 68 of the riser tube. The power head 66 which sucks water from chamber 64 through riser tube 62 has a motor-driven water pump. The construction of the power head is disclosed in detail, for example in U.S. Pat. No. 4,512,724.

Water is filtered by filter 52. The aquarium contaminants drawn between the particles of the gravel, which forms the aquarium bed, is mechanically filtered as the contaminants become physically entrapped in the gravel bed 54. Additionally, aerobic bacteria which accumulates on the gravel and on the filter plate provides for biological filtration of the aquarium water. Thereby, the aquarium gravel bed 54 serves as a mechanical and biological filtering device which traps particles and in addition, converts some sewage particles into non-toxic substances.

Power head 66 is provided with an outlet tube 70 which typically has a nozzle which directs the water sucked by the pump of power head 66 from chamber 64 back into the aquarium tank 50. Power heads of this type can also be equipped with aeration means to aerate the water returning into the aquarium.

The flow meter 10 described in connection with FIGS. 1 and 2 is placed in the riser tube 62. The flow meter is frictionally positional within the riser tube and is retained in place by a tight fit. The filtered water collected in chamber 64 between the perforated wall 56 and the bottom wall of the aquarium is drawn from the chamber by a suction action of the power head 66. Water sucked from chamber 64 rises along tube 62 and flows through the flow meter 10 before it reaches the power head. Thus the flow rate is indicated by the position of float 36 on scale 30 of the flow meter. The water sucked by the power head is aerated in the power head and returned to the aquarium tank 50 through outlet tube 70.

Figure 5:
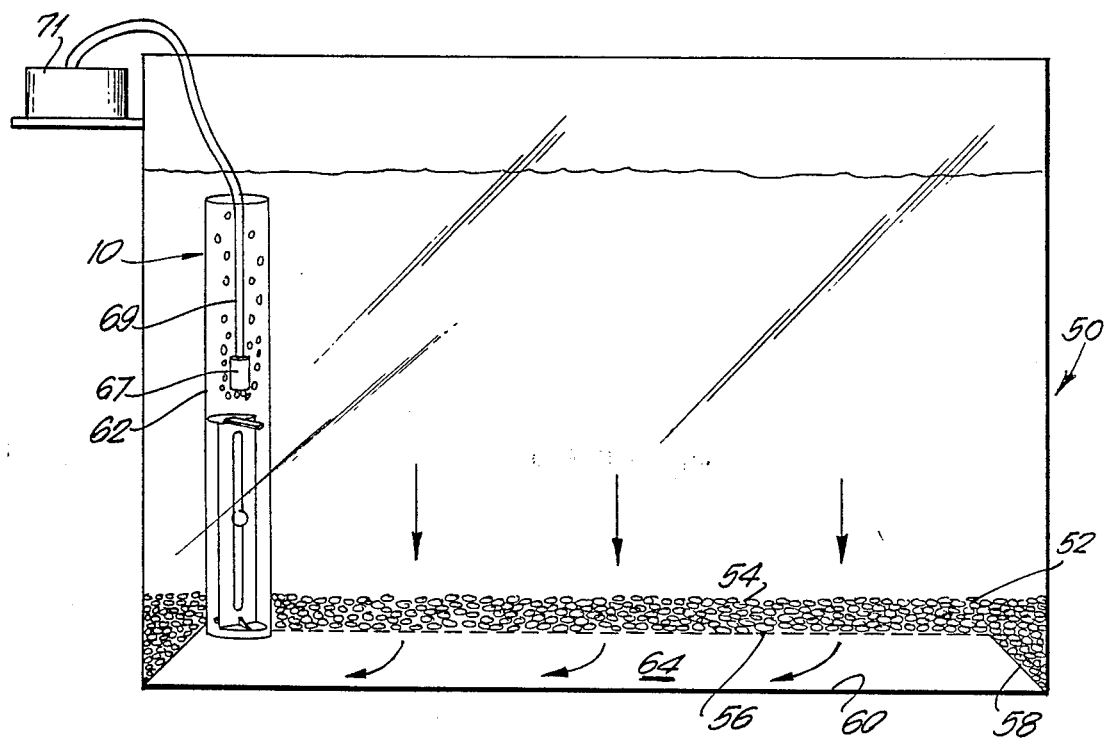
FIG. 5 is a view similar to FIG. 4 and showing the use of an air lift arrangement in the riser tube.

FIG. 5 shows an arrangement similar to FIG. 4 but now places the flow meter further to the bottom of the riser tube 62. Above the flow meter, and downstream thereof is placed an air store 67 connected to an air tube 69 coupled to an air pump 71 supported externally of the tank. Air pumped through the air store causes bubbles to rise in the riser tube causing an air lift effect in the riser. The flow meter will measure the rate of flow of the water.

Figure 6:
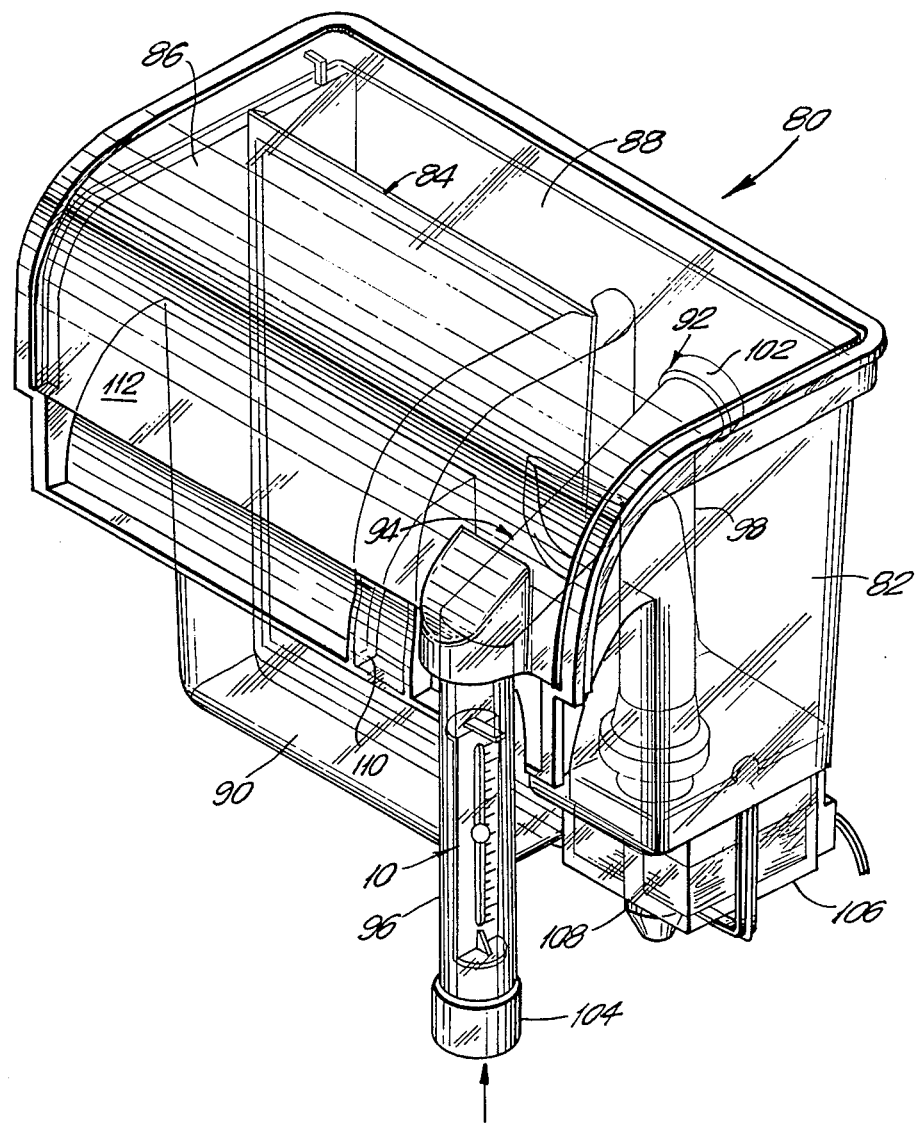
FIG. 6 is a perspective view of an external aquarium filter with the flow meter inserted in the intake tube of the filter.

With reference to FIG. 6 it will be seen that the flow meter 10 is employed in an aquarium filter apparatus generally designated at 80 and comprising a container 82 accommodating a filter cartridge 84. The aquarium filter 80 is of a type which is placed externally of the aquarium tank and is described in detail in applicant's U.S. Pat. No. 4,512,885 which is incorporated herein by reference. Container 82 which is formed of transparent plastic material is covered with a cover member 86, also of transparent plastic. The filtering chamber within tank 82 is divided by the filter cartridge 84 inserted therein. The compartment of tank 82 formed between a rear wall 88 of the tank and the filter cartridge 84 is the filtering chamber whereas the compartment formed forward of the filter cartridge 84 and extending up to a front wall 90 defines a clean water compartment. Filter cartridge 84 extends substantially over the entire height of tank 82. A water intake assembly 92 is positioned in tank 82. The intake assembly is removable and comprises a substantially U-shaped intake flow tube 94 including a first vertical leg 96 and a second vertical leg 98 interconnected by a connecting leg 100. Vertical leg 96 terminates at its lower end at a level lower than the termination of leg 98.

An upper distal end 102 of leg 100 extends beyond its interconnection with leg 98 and is closed with a plug serving as a control valve. The lower distal end of leg 98 terminates in a collar 104. An extension tube (not shown) can be inserted into the collar 104. A rotor assembly of an impeller-type 106 snugly fits into a chamber within a stator unit.

With the intake assembly positioned in the filter container 82 the filter assembly 80 is then positioned over the upper edge of an aquarium with a ledge 110 of a spillway 112 so as to retain the filter in place at the upper edge of the aquarium tank.

When the filter 80 is properly positioned, the downwardly extending water intake leg 96 reaches into the aquarium water. The motor 106 is then energized by connecting it to a source of energy. This will then energize the stator and cause the rotor to turn. This in turn will cause the motor impeller to begin pumping. As a result, the contaminated water which is drawn up through the vertical intake tube 96 and into the aquarium filter for filtration and subsequent return to the aquarium.

Flow meter 10 is inserted in the intake flow tube 96. The flow meter is secured in place by friction engagement with the inside walls of the intake tube. The flow rate of the water drawn into leg 96 from the aquarium tank is measured and indicated on the scale of the flow meter 10.

In both arrangements of FIGS. 4 and 5, the motor pump or power head is located downstream of the flow meter. The range of the flow rate to be measured by the flow meter according to the invention is typically between 5 gal/hr to 300 gal/hr.

There has been described heretofore the best embodiments of the invention presently contemplated. However, it is to be understood that various changes and modifications may be made thereto without departing from the spirit of the invention.

What is claimed is:

1. A flow meter for insertion in a flow tube of an aquarium filter for measuring the flow rate of water being filtered and returned into an aquarium tank, the flow meter comprising:
    an insert snugly fit within the flow tube;
    scale means provided with respect to said insert;
    a metering float for floating in the flow tube adjacent the scale means for indicating on said scale means a flow rate of water passing through said container, said insert subdividing an interior of said tube into two opposite sides along an axis of said tube and externally of said insert, said insert being provided with an elongated slot; and
    means defining a flow path of water passing said insert, said flow path defining means being constructed so as to permit water to flow within said tube along one of said sides into said slot and along said another opposite side, to raise the float to a height dependent upon the rate of flow of the water.

2. A flow meter as in claim 1, wherein said insert comprises, a plate formed with said slot, and two end flanges extending perpendicular to said plate and in two diametrically opposite directions therefrom.

3. A flow meter as in claim 2, wherein said flow tube is substantially cylindrical.

4. A flow meter as in claim 3, wherein said flanges are substantially semi-circular.

5. A flow meter as in claim 4, wherein said insert includes at each end thereof a narrow finger-like strip extending normal to said plate and in the direction away from a respective end flange; said flanges, said slot and said strips defining said flow path means.

6. A flow meter as in claim 5, wherein each said strip has an end face facing away from said end flange, said end face forming with a diametrically opposing point of said semi-circular flange a dimension corresponding to an inner diameter of said container.

7. A flow meter as in claim 6, wherein said plate has a width corresponding to the inner diameter of said container.

8. A flow meter as in claim 1, wherein said slot has substantially parallel side edges.

9. A flow meter as in claim 8, wherein said scale means includes a varying scale provided on a front side of said insert laterally of said slot.

10. A flow meter as in claim 1 wherein said slot has a varying width along an axis of elongation thereof.

11. A flow meter as in claim 1, wherein said flow tube is a riser tube of an undergravel filter.

12. A flow meter as in claim 11, wherein an air lift tube is provided in the riser tube above said flow meter.

13. A flow meter as in claim 11, wherein said riser tube supports a power head at an upper edge thereof for drawing water through said riser tube, said power head being downstream of said flow meter.

14. A flow meter as in claim 1, wherein said flow tube is an intake tube of an external aquarium filter.

15. A flow meter as in claim 14, wherein said intake tube is connected to a pump of said aquarium filter, said pump drawing water through said intake tube, said pump being downstream of said flow meter.

16. A flow meter for insertion in a flow tube of an aquarium filter for measuring flow rate of water being filtered and returned into an aquarium tank, the flow meter comprising:
    an insert snugly fitting in the flow tube;
    scale means provided with respect to said insert;
    a metering float floating adjacent said insert for indicating on said scale means a flow rate of water passing through the flow tube; and
    means defining a flow path of water passing adjacent said insert,
    said insert including a plate being of a width corresponding to an inner diameter of said flow tube and having a central elongated slot, said insert further including at two opposite ends thereof respective flanges extending in opposite directions from and perpendicular to said plate, so that said flanges respectively block a flow path of water at opposing ends of the two sides of said plate causing the water to flow along one side of the plate, then into said slot and then along the other side of the plate.

17. A flow meter as in claim 16, wherein said flanges are semi-circular and together define a diameter corresponding to an inner diameter of said container.

18. A flow meter as in claim 17, wherein said insert further includes two narrow strips each secured to a respective one of said flanges and extending away therefrom.

19. A flow meter for insertion in a flow tube of an aquarium filter for measuring the flow rate of water being filtered and returned into an aquarium tank, the flow meter comprising:
   an insert snugly fit within the flow tube;
   scale means provided with respect to said insert;
   a metering float for floating in the flow tube adjacent the scale means for indicating on said scale means a flow rate of water passing through said container, said insert being provided with an elongated slot; and
   means defining a flow path of water passing said insert, said flow path defining means being constructed so as to permit water to flow along one side of said insert into said slot and along another opposite side of said insert, to raise the float to a height dependent upon the rate of flow of the water,
   said insert comprising a plate formed with said slot and two end flanges extending perpendicular to said plate and in two diametrically opposite directions therefrom.

20. A flow meter as in claim 19, wherein said flow tube is substantially cylindrical.

21. A flow meter as in claim 20, wherein said flanges are substantially semi-circular.

22. A flow meter as in claim 21, wherein said insert includes at each end thereof a narrow finger-like strip extending normal to said plate and in the direction away from a respective end flange; said flanges, said slot and said strips defining said flow path means.

23. A flow meter as in claim 22, wherein each said strip has an end face facing away from said end flange, said end face forming with a diametrically opposing point of said semi-circular flange a dimension corresponding to an inner diameter of said container.

24. A flow meter as in claim 23, wherein said plate has a width corresponding to the inner diameter of said container.

25. A flow meter as in claim 19, wherein said slot has substantially parallel side edges.

26. A flow meter as in claim 25, wherein said scale means includes a varying scale provided on a front side of said insert laterally of said slot.

27. A flow meter as in claim 19, wherein said slot has a varying width along an axis of elongation thereof.

28. A flow meter as in claim 19, wherein said flow tube is a riser tube of an undergravel filter.

29. A flow meter as in claim 28, wherein an air lift tube is provided in the riser tube above said flow meter.

30. A flow meter as in claim 29, wherein said riser tube supports a power head at an upper edge thereof for drawing water through said riser tube, said power head being downstream of said flow meter.

31. A flow meter as in claim 19, wherein said flow tube is an intake tube of an external aquarium filter.

32. A flow meter as in claim 31, wherein said intake tube is connected to a pump of said aquarium filter, said pump drawing water through said intake tube, said pump being downstream of said flow meter.

* * * * *

UNITED STATES PATENT AND TRADEMARK OFFICE
CERTIFICATE OF CORRECTION

PATENT NO. : 4,934,187

DATED : June 19, 1990

INVENTOR(S) : KLAUS WOLTMAN

It is certified that error appears in the above-identified patent and that said Letters Patent is hereby corrected as shown below:

On the title page:

[73] Assignee: WILLINGER BROS., INC.
                          Wright Way
                          Oakland, New Jersey Signed and Sealed this Tenth Day of September, 1991

*Attest:*

HARRY F. MANBECK, JR.

*Attesting Officer*            *Commissioner of Patents and Trademarks*